United States Patent [19]
Knapp

[11] Patent Number: 5,865,067
[45] Date of Patent: Feb. 2, 1999

[54] PEDAL MOUNTING STRUCTURE AND METHOD OF INSTALLING A PEDAL IN AN AUTOMOTIVE VEHICLE

[76] Inventor: Richard C. Knapp, 6848 Tamerlane Dr., West Bloomfield, Mich. 48322

[21] Appl. No.: 744,329

[22] Filed: Nov. 6, 1996

[51] Int. Cl.⁶ .................................................. G05G 1/14
[52] U.S. Cl. ........................ 74/512; 74/560; 411/383
[58] Field of Search ............................ 74/512, 513, 514, 74/560, 561, 562, 562.5; 411/383, 384, 178

[56] References Cited

U.S. PATENT DOCUMENTS

| | | | |
|---|---|---|---|
| 1,586,454 | 5/1926 | McTague | 74/512 X |
| 2,524,486 | 10/1950 | Snow | 74/562.5 |
| 2,645,948 | 7/1953 | Beckman | 74/562.5 |
| 3,765,264 | 10/1973 | Bruhn, Jr. . | |
| 3,766,802 | 10/1973 | Shellhause . | |
| 4,130,027 | 12/1978 | Leighton . | |
| 4,297,550 | 10/1981 | Leighton | 74/514 X |
| 4,533,028 | 8/1985 | Taig . | |
| 4,655,628 | 4/1987 | Parker . | |
| 4,662,237 | 5/1987 | Kami et al. . | |
| 4,779,481 | 10/1988 | Natzke et al. . | |
| 4,819,500 | 4/1989 | Musumiya et al. | 74/513 |
| 4,875,385 | 10/1989 | Sitrin | 74/512 |
| 5,165,299 | 11/1992 | Mizuma et al. . | |
| 5,398,569 | 3/1995 | Carr . | |
| 5,416,295 | 5/1995 | White et al. . | |

FOREIGN PATENT DOCUMENTS

| | | | |
|---|---|---|---|
| 363755 | 4/1906 | France | 411/178 |
| 12222 | 4/1915 | United Kingdom | 411/178 |
| 2066402 | 7/1981 | United Kingdom | 411/383 |

*Primary Examiner*—Charles A. Marmor
*Assistant Examiner*—Scott Luno
*Attorney, Agent, or Firm*—Dykema Gossett PLLC

[57] ABSTRACT

An improved mounting assembly for mounting a foot-operated pedal to a bracket in an automobile has a retaining shaft having a portion with external threads. The foot-operated pedal preferably has an aperture therethrough with internal threads sized to engage the external threads of the retaining shaft. The retaining shaft is placed through the bracket and the aperture in the foot-operated pedal so that the foot-operated pedal is rotatably positioned on the external threads of the retaining shaft. The retaining shaft may be comprised of a first stud and a second stud. The bracket used in the vehicle may have a first flange and a second flange spaced apart a predetermined distance. Each flange has an aperture therethrough. The first stud extends only partially between the first and second flanges of the bracket. The second stud couples to the first stud through the opposite flange of the bracket than that which the first stud is mounted.

20 Claims, 2 Drawing Sheets

PEDAL MOUNTING STRUCTURE AND METHOD OF INSTALLING A PEDAL IN AN AUTOMOTIVE VEHICLE

BACKGROUND OF THE INVENTION

The present invention relates generally to a pedal mounting structure for an automotive vehicle, and more particularly, to a pedal mounting structure having minimal parts to allow serviceability and adjustability after assembly.

Foot operated control pedals in automotive vehicles are used for throttle control, brake control and clutch control. The control pedals are typically rotatably mounted to a bracket in the vehicle located under the instrument panel. Typically, a bolt or other axis defining axle is passed through the bracket and control pedal. The control pedal rotates about the axis.

Several mounting methods use a single axle to mount the control pedal. One disadvantage of using a single axle to mount a control pedal is that a large space is required for inserting the axle into the bracket. Enough space must be left for inserting the axle, for any tools for inserting and tightening the axle and the operator of the tools to have access to the axle. In smaller vehicles, space is increasingly at a premium. Therefore, providing an assembly requiring a small amount of space is desirable.

Typically in these single axle type mounting systems, an axle is used in conjunction with spacers, bushings and an outer axle which rotates around the inner axle. Another disadvantage of single axle mounting systems is that a significant number of parts must be assembled for such configurations. Yet, another disadvantage of single axle type mounting is that once assembled no means is provided for adjusting the position of the pedal.

Another type of pedal mounting uses a snap-in connection to mount the pedal to the bracket. The pedal mount is spring loaded. The preassembled pedal is compressed axially and inserted into the bracket. Once the holes in the bracket are aligned with the compressed axle, the axle is released and expands into the holes of the bracket. One disadvantage to such a system is that the pedal is not adjustable axially with respect to the snap-in connecting means. Another disadvantage is that it is believed that such a system due to its many components would provide a source of noise due to the vibration of its many components rattling together.

It would therefore be desirable to provide a pedal mounting system that is easy to assemble, service, adjust after assembly and is devoid of vibrations during operation of the vehicle.

SUMMARY OF THE INVENTION

One embodiment of an improved mounting assembly for mounting a pedal to a bracket in an automobile has a retaining shaft having a portion with external threads. The pedal preferably has an aperture therethrough with internal threads sized to engage the external threads of the retaining shaft. The retaining shaft is placed through the bracket and the aperture in the pedal so that the pedal is rotatably positioned on the retaining shaft on the external threads of the retaining shaft.

In one embodiment, the retaining shaft is comprised of a first stud and a second stud. The bracket used in the vehicle has a first flange and a second flange spaced apart a predetermined distance. Each flange has an aperture therethrough. The first stud extends only partially between the first and second flanges of the bracket. The second stud couples to the first stud through the opposite flange of the bracket than that which the first stud is mounted. In this embodiment, less assembly and service room is required since each shaft is shorter than the predetermined distance between the flanges of the bracket.

In another embodiment of the invention, the first stud has a bore with external threads therein. The second stud has a shank having external threads sized to be received within the bore. To assemble, the pedal is placed upon the first stud and the shank of the second stud is inserted within the bore of the first stud and tightened along the matching threads.

In each embodiment, O-ring insulators may be placed between the first and second studs and the bracket to reduce vibration noise. Also, it is preferred that the retaining shaft does not rotate with respect to the bracket during operation of the pedal. O-ring insulators may provide a means to prevent rotation.

In another embodiment a method for installing the pedal into the automotive vehicle uses a fixture on which the brake pedal is positioned. The brake pedal is located along a retaining shaft in a predetermined location with respect to the bracket. The bracket with the pedal mounted thereto is placed in the vehicle during the assembly of the vehicle. The retaining shaft preferably has external threads which are rotatably engaged with the internal threads in the aperture of the pedal.

In one assembly embodiment, the retaining shaft preferably is comprised of a first stud and a second stud. The first stud has the external threads and is inserted first through a flange of the bracket and the external threads are engaged into the aperture of the pedal. The second stud is then inserted in an opposite direction through the other side of bracket. The first stud is preferably threadably engaged with the second stud.

One advantage of the present invention is that since the retaining shaft and the brake pedal have engageable threads, after assembly the axial position of the brake pedal along the retaining shaft may be adjusted by rotating the retaining shaft and allowing the internal threads within the aperture of the pedal to travel along the external threads on the retaining shaft.

BRIEF DESCRIPTION OF THE DRAWINGS

Other features and advantages of the present invention will become apparent from the following detailed description which should be read in conjunction with the drawings in which.

DETAILED DESCRIPTION OF THE PREFERRED EMBODIMENT

Figure 1:
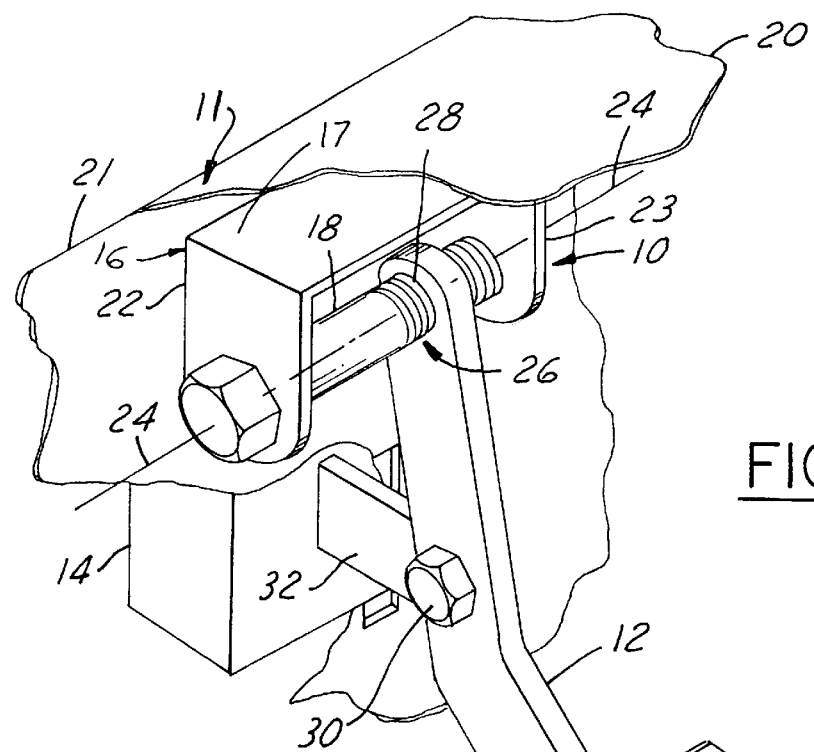
FIG. 1 is a perspective view of the pedal mounting assembly of the present invention.

Referring now to the drawings, like reference numerals are used to identify identical components in the various views. Although the invention is illustrated in the context of a brake pedal, it will be appreciated that this invention may be used in conjunction with other pedal mounting structures such as an accelerator or clutch pedal.

FIG. 1 shows a mounting structure 10 for use in an automotive vehicle fragmentally shown as 11. Mounting structure 10 mounts a brake pedal 12 in relation to a brake system partially shown at 14. Automotive vehicle 11 includes brake pedal 12, brake system 14, an instrument panel 20 and an engine compartment wall 21. Mounting structure 10 includes a bracket 16 and a retaining shaft 18.

Bracket 16 is secured to the vehicle under an instrument panel 20. Bracket 16 may also be attached to engine compartment wall 21. Bracket 16 has a base 17 and a pair of first and second flanges 22 and 23 extending therefrom at the ends thereof. Flanges 22 and 23 may have apertures or openings through which retaining shaft 18 is inserted. The apertures and retaining shaft 18 may be aligned along an axis of rotation 24 around which brake pedal 12 rotates. Retaining shaft 18 preferably has external threads 26 where brake pedal 12 is mounted to retaining shaft 18. Retaining shaft 18 preferably does not rotate with respect to bracket 16.

Pedal 12 is mounted to retaining shaft 18 through an aperture 28. Aperture 28 is preferably internally threaded so that external threads 26 engage the internal threads of aperture 28. Pedal 12 also includes a bolt 30 used to secure a rod 32 to link pedal 12 to brake system 14. As force is applied to the end of pedal 12, pedal 12 rotates on retaining shaft 18. The degree of desired actuation of brake system 14 is controlled by the movement of brake pedal 12 that is communicated into movement of rod 32.

In one configuration pedal 12 may be preinstalled onto bracket 16. Then, bracket 16 and pedal 12 may be installed into the vehicle. Once installed in the vehicle, pedal 12 may then be connected to the system it operates such as brake system 14.

Figure 2:
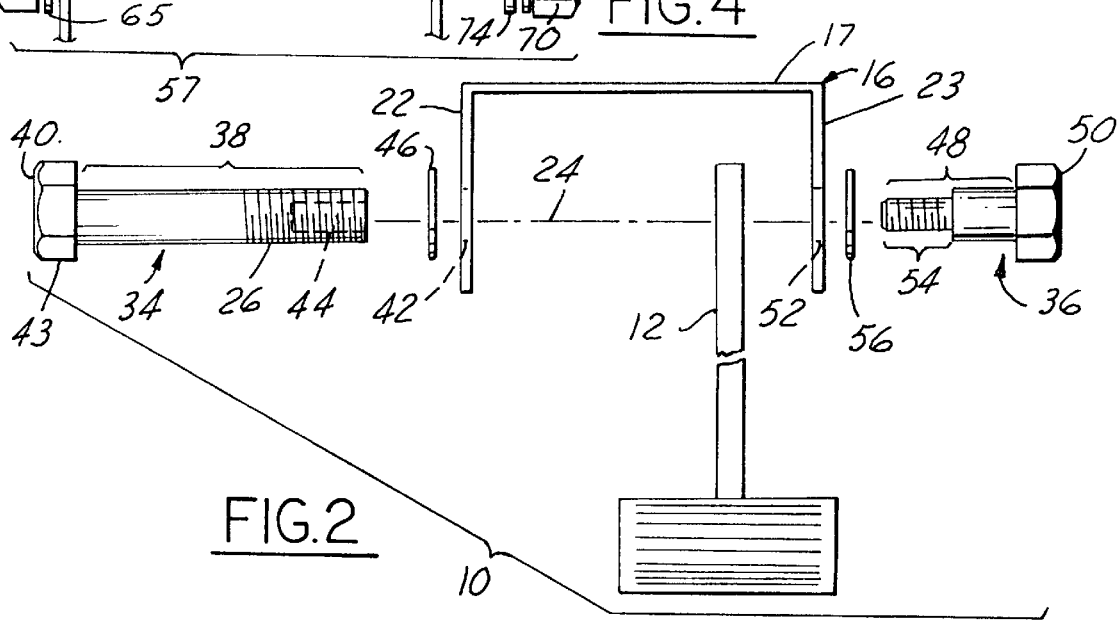
FIG. 2 is an exploded view of the pedal mounting assembly.

Referring now to FIG. 2, retaining shaft 18 may be comprised of a first stud 34 and a second stud 36. First stud 34 preferably has a shank 38 at least a portion of which has external threads 26. Preferably, the length of shank 38 is less than the distance between flanges 22 and 23. Shank 38 may have external threads along the full length.

First stud 34 may also have an end cap 40. End cap 40 is sized larger than aperture 42 in flange 22 to retain first stud 34 within aperture 42. End cap 40 may have flats 43 to assist in holding and tightening by hand or an assembly tool.

First stud 34 preferably has an axial bore 44 in shank 38 opposite end cap 40. Bore 44 preferably has internal threads.

Before first stud 34 is inserted through aperture 42, an insulating O-ring 46 or bushing may be placed over shank 38. When pedal 12 is assembled O-ring 46 lies between bracket 16 and first stud 34. O-ring 46 is used to reduce vibration noise from between first stud 34 and bracket 16.

Second stud 36 has a shank 48 and an end cap 50. Aperture 52 in flange 23 is sized to receive the widest portion of shank 48. Shank 48 preferably has external threads 54. External threads 54 are sized to be received within bore 44. The length of shank 48 allows external threads 54 to be inserted within bore 44 to support brake pedal 12.

Second stud 36 may also have an end cap 50. End cap 50 is sized larger than aperture 52 in flange 23 to retain second stud 36 within aperture 52. End cap 50 may have flats 53 to assist in holding and tightening by hand or by an assembly tool.

Before shank 48 is inserted within aperture 52, an O-ring 56 may be placed around shank 48 to prevent vibration noise between second stud 36 and flange 23.

Figure 3:
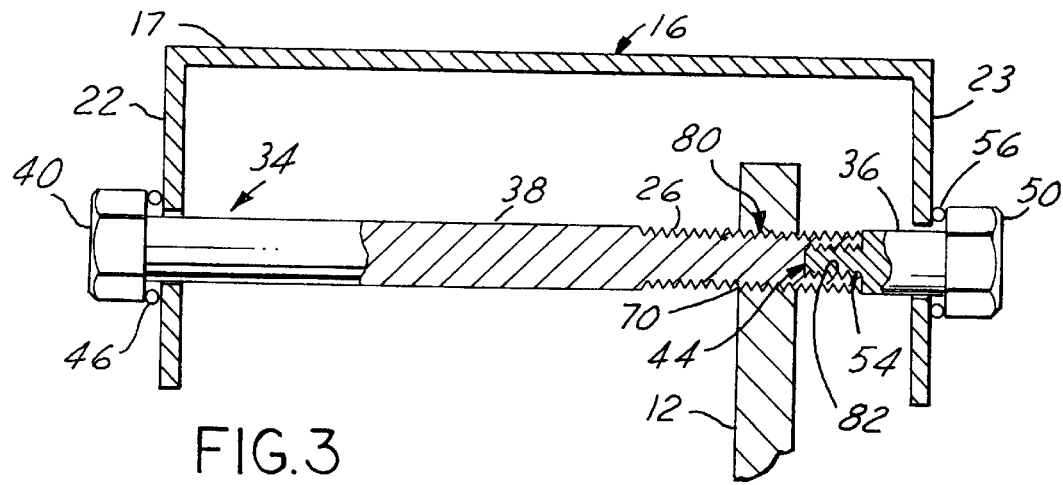
FIG. 3 is a cross-sectional view of a pedal mounting assembly.

Referring now to FIG. 3, brake pedal 12 has an aperture 70 with internal threads 80 that align with external threads 26 on shank 38.

Bore 44 of shank 38 has internal threads 82 that engage external threads 54 of second stud 36. Assembly requires bore 44 to align with external threads 54 so that external threads 54 and internal threads 82 are aligned and tightened.

After brake pedal 12 is placed on first stud 34, first stud 34 and second stud 36 are connected, the position of brake pedal 12 with respect to flanges 22, 23 may be changed. To change the position of brake pedal 12 both the first stud 34 and second stud 36 are rotated together while brake pedal 12 is prevented from rotating. Depending on the direction of external threads 26 and the rotation of first stud 34 and second stud 36, brake pedal 12 may move closer to or away from flange 23 in an axial direction. If external threads are provided across the entire length of retaining shaft 18, pedal 12 may be adjusted to any position between flanges 22 and 23.

Figure 4:
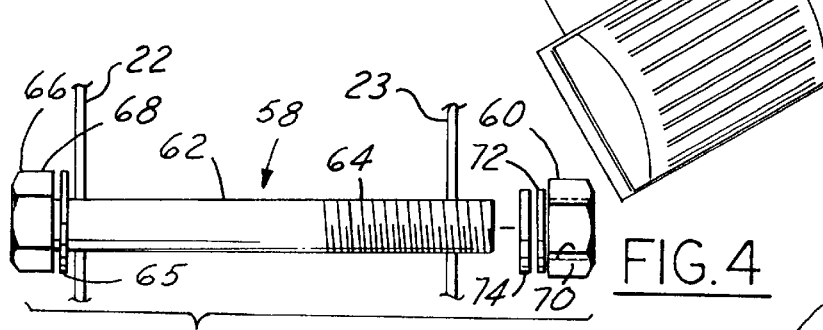
FIG. 4 is an alternative retaining shaft that may be used in place of the retaining shaft of FIG. 2.

Referring now to FIG. 4, an alternative retaining shaft 57 to that of FIG. 2 is shown. The alternative retaining shaft 57 has a bolt 58 and a nut 60. Bolt 58 has a shank 62 having external threads 64 and an end cap 66. End cap 66 preferably has flats 68 which may be used for engaging a tool for tightening bolt 58 in place. In this embodiment, the length of shank 62 preferably extends across bracket 16 through both flanges 22, 23 so that nut 60 may be received on external threads 64. An O-ring 65 may be placed between flange 22 and end cap 66 to prevent vibration noise between flange 22 and end cap 66.

Nut 60 preferably has an internally threaded aperture 70. The threads of aperture 70 are preferably sized to engage external threads 64. Before nut 60 is inserted onto external threads 64, a lock washer 72 may be inserted over threads 64 to help retain nut 60 on shank 62. An O-ring 74 may also be placed over shank 62 between nut 60 and flange 23 to prevent vibration noise between nut 60 and flange 23. The configuration in FIG. 4 is most desirable in automotive vehicles having enough clearance under the instrument panel for mounting since the configuration of FIG. 4 requires more insertion space than that of FIG. 2.

As an alternative to FIG. 4, nut 60 may be integrally formed into flange 23 by utilizing a clinch nut-type configuration.

Figure 5:
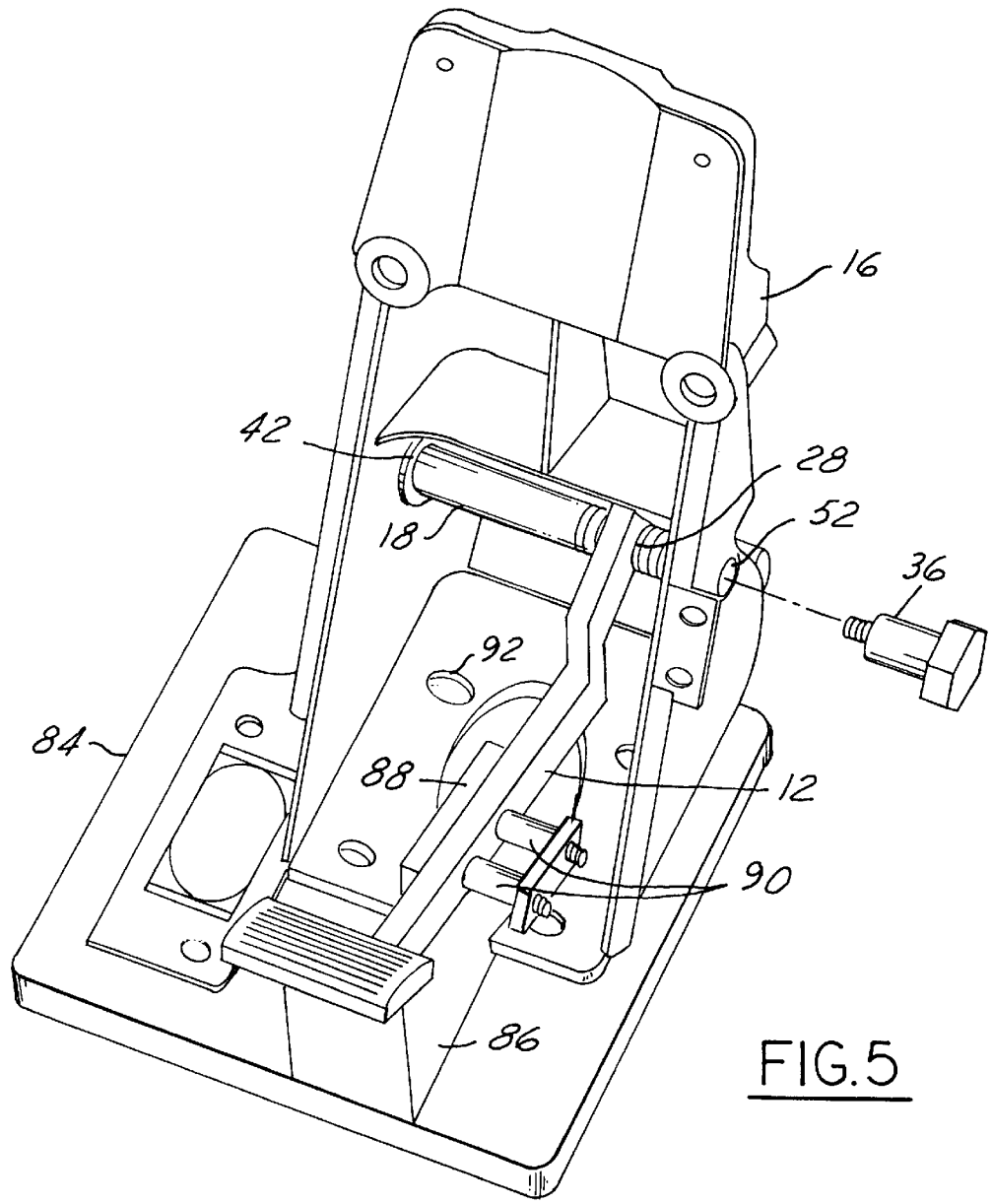
FIG. 5 is a perspective view of a pedal mounting fixture used in the assembly of the pedal mounting structure.

Referring now to FIG. 5, pedal 12 may be mounted to bracket 16 prior to assembly in the vehicle. A fixture 84 is used to position brake pedal 12 with respect to bracket 16. Bracket 16 is secured to fixture 84. Fixture 84 has a support 86 onto which pedal 12 is placed. Support 86 may use a stop 88 and retaining springs 90 to assist in locating pedal laterally with respect to bracket 16. Retaining springs 90 urge pedal 12 against stop 88 so that aperture 28 in pedal 12 is axially aligned in a predetermined position with respect to apertures 42 and 52 in bracket 16. After locating pedal 12, retaining shaft 18 may be inserted through apertures 42 and 52 and threaded through aperture 28. The assembled bracket 16 and pedal 12 may then be removed from fixture 84 and connected to automobile through locating holes 92. Bolts preassembled in the vehicle may be used to fasten through holes 92. Once assembled, an arm used to control the operation of a system such as a brake system may be connected to pedal 12.

While the best mode for carrying out the present invention has been described in detail, those familiar with the art to which this invention relates will recognize various alternative designs and embodiments for practicing the invention as defined by the following claims. For example, the apertures in the bracket may also be threaded.

What is claimed is:

1. A foot-operated pedal mounting assembly for an automotive vehicle comprising:

a support bracket of U-shaped configuration having a base with a first flange at one end thereof and a second flange at the other end thereof, said first and second flanges having aligned openings therein;

a retaining shaft having an axis of rotation and extending through the openings of said first and second flanges and carried by said support bracket, said retaining shaft being spaced from said base and having at least a portion thereof provided with external threads, with at least some of said external threads being located between said first and second flanges;

retaining means for non-rotatably retaining said retaining shaft on said support bracket; and a foot-operated pedal having an aperture at an end thereof, said aperture having internal threads engaged with said external threads of said retaining shaft between said first and second flanges, wherein said foot-operated pedal is rotatable relative to said retaining shaft as force is applied to said foot-operated pedal.

2. A foot-operated pedal mounting assembly as recited in claim 1 wherein said retaining shaft comprises a bolt with external threads and a nut with internal threads, said bolt extending through the flanges of said support bracket, said external threads of said bolt receiving said internal threads of said nut.

3. A foot-operated pedal mounting assembly as recited in claim 1 wherein said retaining shaft comprises a first stud coupled to a second stud, with all of said external threads being located between said first and second flanges on said first and second studs.

4. A foot-operated pedal mounting assembly as recited in claim 3 further comprising means located between said flanges for detachably connecting said first stud and said second stud.

5. A foot-operated pedal mounting assembly as recited in claim 4 wherein said means for detachably connecting said first stud and said second stud include an axial bore within and at one end of said first stud and a shank on an end of said second stud sized to be received within said axial bore of said first stud.

6. A foot-operated pedal mounting assembly as recited in claim 5 wherein said axial bore of said first stud has internal threads, said shank of said second stud having external threads engaged with the internal threads in said bore so that said first stud is secured to said second stud through the engagement of said internal threads of said bore with the external threads of said shank.

7. A foot-operated pedal mounting assembly as recited in claim 3 wherein said first flange of the support bracket is spaced a predetermined distance from said second flange, said first stud having a length less than the predetermined distance between said first and second flanges.

8. A foot-operated pedal mounting assembly as recited in claim 7 wherein said retaining means comprises a first end cap extending from the first stud of said retaining shaft and being larger than the opening in said first flange and an O-ring insulator sized to be received on said first stud between said first end cap and said first flange and said retaining means further comprising a second end cap extending from the second stud of said retaining shaft and being larger than the opening in said second flange and a second O-ring insulator sized to be received on said second stud between said second end cap and said second flange.

9. A foot-operated pedal mounting assembly as recited in claim 1 wherein said retaining means comprises an end cap extending from said retaining shaft and an O-ring insulator sized to be received on said retaining shaft between said end cap and one of said first and second flanges of said support bracket.

10. A foot-operated pedal mounting assembly as recited in claim 1 further comprising a rod coupled to said foot-operated pedal, said rod being adapted to connect said foot-operated pedal to a brake system of the automotive vehicle.

11. An automotive vehicle comprising:

a foot-operated pedal mounting assembly, said assembly having, a support bracket of U-shaped configuration mounted within the automotive vehicle and having a base, and a first flange and a second flange each extending outwardly from said base said first flange being spaced a predetermined distance from said second flange, said first and said second flanges having a first opening and a second opening respectively;

a retaining shaft having an axis of rotation extending through said first and second openings in said first and second flanges carried by said support bracket, said retaining shaft being spaced from said base and having at least a portion thereof provided with external threads, with at least some of said external threads being located between said first and second flanges;

retaining means non-rotatably for retaining said retaining shaft on the flanges of said support bracket; and a foot-operated pedal having an aperture at an end thereof, said aperture having internal threads engaged with the external threads of said retaining shaft between said first and second flanges.

12. An automotive vehicle as recited in claim 11 wherein said retaining shaft comprises a bolt with external threads and a nut with internal threads, said bolt extending through said first and second flanges of the support bracket, said internal threads of said nut.

13. An automotive vehicle as received in claim 11 wherein said retaining shaft comprises a first stud coupled to a second stud, with all of said external threads being located between said first and second flanges on said first and second studs.

14. An automotive vehicle as recited in claim 13 further comprising means located between said flanges for detachably connecting said first stud and said second stud.

15. An automotive vehicle as recited in claim 14 wherein said means for detachably connecting said first stud and said second stud includes an axial bore within and at one end of said first stud and a shank on an end of said second stud sized to be received within said axial bore of said first stud.

16. An automotive vehicle as recited in claim 15 wherein said axial bore of said first stud has internal threads, said shank of said second stud has external threads engaged with the internal threads in said bore so that said first stud is secured to said second stud through the engagement of said internal threads of said bore with the external threads of said shank.

17. An automotive vehicle as recited in claim 13 wherein said first stud has a length which is less than said predetermined distance between said first and second flanges.

18. An automotive vehicle as recited in claim 11 wherein said retaining means comprises a first end cap extending from said retaining shaft and a first O-ring insulator sized to be received on said retaining shaft between said first end cap and the first flange of said support bracket.

19. An automotive vehicle as recited in claim 18 wherein said retaining means comprises a second end cap extending from said retaining shaft and a second O-ring insulator sized to be received on said retaining shaft between said second end cap and the second flange of said support bracket.

20. An automotive vehicle as recited in claim 11 further comprising a rod coupled to said foot-operated pedal, said rod being adapted to connect said foot-operated pedal to a brake system of the automotive vehicle.

* * * * *